Jan. 16, 1934. E. D. RUTH 1,943,487
PROCESS OF CHLORINATING WATER
Original Filed June 16, 1931
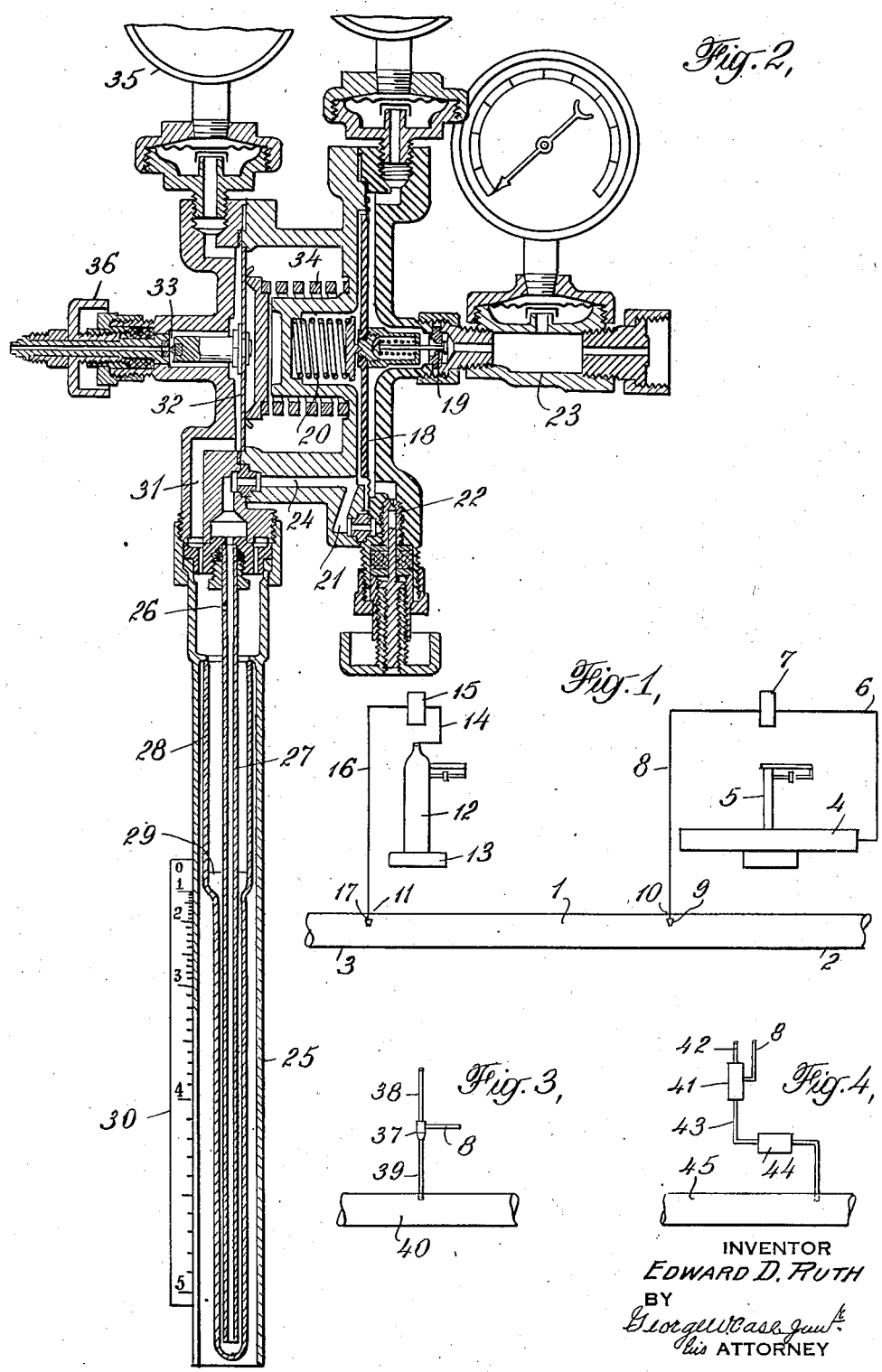
INVENTOR
EDWARD D. RUTH
BY
George W. Case Jun.
his ATTORNEY Patented Jan. 16, 1934

1,943,487

UNITED STATES PATENT OFFICE 1,943,487

PROCESS OF CHLORINATING WATER

Edward D. Ruth, Lancaster, Pa., assignor to Howard J. Pardee, Long Island City, N. Y.

Application June 16, 1931, Serial No. 544,918
Renewed November 22, 1933

5 Claims. (Cl. 210—28)

This invention relates to a method of chlorinating water, sewage or other liquids whereby objectionable tastes are eliminated, the final sterilization is more complete and the effect of the sterilization extended.

The primary object of the present invention is to provide a new and novel means which allows proper sterilization with chlorine, or its compounds, of water supplies, swimming pools, sewage and other liquids which require sterilization and without the formation of objectionable tastes and odors in the final product. At the same time the efficiency of the sterilization is increased and its effects last over a longer period of time, and withal, lesser amounts of chlorine are required.

The invention, broadly, consists of introducing anhydrous ammonia gas to the water or liquid to be treated before the chlorine or a chlorine compound is introduced so that there is a reaction period between the ammonia and the water or other liquid before the chlorine reacts with it.

Figure 1 shows diagrammatically a layout embodying the essentials of the process.

Figure 2 shows in cross section an accurate gas control unit that can be used to control the ammonia and chlorine.

Figure 3 is a fragmentary view showing the use of an injector for introducing the ammonia into the water or liquid against pressure.

Figure 4 is a fragmentary view showing the use of a pump for introducing a solution of the ammonia.

Referring to Figure 1, the water or liquid to be treated is assumed flowing through the pipe 1 in a direction from point 2 to point 3. The ammonia is introduced at the point 10. The chlorine, for example in the form of dry gas, is introduced at point 11. There is sufficient distance between point 10 and point 11 so that the ammonia has time to react with the water during the time the water is flowing from 10 to 11.

The water or liquid need not be in a pipe for this treatment. It may be in a tank or reservoir. In this case the ammonia is added to the body of water and after a sufficient period, say about two hours, the chlorine is added. Or instead of a pipe the water may be flowing through a series of devices as at a filter plant. Here the ammonia may be added to the water as it enters the plant at the entrance to the coagulation basins and the chlorine added to the effluent from the filters. Numerous other arrangements will suggest themselves but the principle is the same in all.

The ammonia can be introduced by a number of methods. In Figure 1 is shown an ammonia tank 4 on platform scales 5. Ammonia is led from the tank 4 through iron pipe 6 to a control unit 7. This control unit allows accurate control of the amount of ammonia introduced into the water. From the unit 7 the ammonia flows through iron pipe 8 to diffuser 9 located in the pipe 1 and from the diffuser 9 into the water flowing therethrough.

The chlorine or chlorine compound can be introduced by any method. Suitable apparatus for this purpose is in extensive use today, and practical equipment can be obtained commercially. In Figure 1 is shown a chlorine cylinder 12 mounted on a platform scale 13 and adapted for feeding chlorine to a control unit 15 through tube 14. From control unit 15 the gas flows through tube 16 to diffuser 17 located in the pipe 1 at a point further along in the flow and where it is introduced into the water.

Figure 2 shows the cross section of a control unit that will accurately control the flow of the ammonia. It should be built of iron and steel or other materials that are not attacked by ammonia. The essential features of this control unit are a front diaphragm member 18 operating an inlet valve 19 and having acting against its back the pressure of a spring 20. Connecting the space in front of this diaphragm 18 with the space at its back is a gas passage 21 containing a control valve 22. The operation of this part of the unit is as follows: Ammonia enters through the inlet manifold 23, flows through the inlet valve 19, across the front of the diaphragm 18, through the gas passage 21 and the control valve 22 to the back of the diaphragm 18 and out through the gas discharge passage 24. Since the pressure on the discharge of the control valve 22 and the force exerted by the spring 20 act on the back of the diaphragm 18 and the pressure at the inlet side of the control valve acts against the front side of the diaphragm 18, this diaphragm 18 will be unbalanced and will move the inlet valve 19 sufficiently to keep these pressures balanced. This will result in maintaining a substantially constant pressure, equal to that of the force exerted by spring 20, being always across the control valve 22 and maintaining a constant uniform flow through it. Adjustment of this flow can be obtained by varying the degrees of opening through the control valve 22.

From the gas passage 24 the ammonia flows through a meter 25 which has an inlet orifice 26 communicating with the gas passage 24 and through which ammonia flows, an inner tube 27 being connected to the inlet of the orifice and extending to the bottom of the meter. An outer tube 28 is connected to the discharge of the orifice, and liquid 29 is maintained in the outer tube 28 for sealing the bottom of the said inner tube 27. The pressure necessary to force the ammonia through the orifice 26 causes the liquid 29 to stand at a lower level in the inner tube 27 than it does in the outer tube 28. This difference in level is measured by a calibrated scale 30 and indicates how much ammonia is flowing through the unit.

The ammonia leaves the meter 25 through gas passage 31 and flows to one side of a rearward diaphragm member 32 and out through the discharge valve 33. A spring 34 acting upon the opposite side of the diaphragm 32 normally keeps discharge valve 33 closed until the ammonia has built up sufficient pressure against diaphragm 32 to push it back and cause the valve to open. Thereafter the pressure of the ammonia in the control unit remains at this discharge or back pressure. This insures a uniform density of gas flowing through the control valve 22 and a uniform weight of gas delivered from the equipment. The back pressure is indicated by the back pressure gauge 35 and can be adjusted by operating handle 36.

There are cases where local conditions make the introduction of the ammonia gas directly to the water either difficult or impossible. Most such cases can be met by carrying the ammonia in a minor body of water. Since the ammonia is very soluble the application in this case is really a solution of ammonia.

Figure 3 shows such a method of application. An iron supply pipe, as the pipe 8 of Figure 1, delivers the ammonia to an injector 37 which is supplied through the pipe 38 delivering water at sufficient pressure to pick up the ammonia and force it through the pipe 39 into the main flow of water in the pipe 40.

Figure 4 shows another arrangement for introducing the ammonia. An iron supply pipe, as the pipe 8 of Figure 1, delivers the ammonia gas to a mixing device 41 which received a minor supply of water through pipe 42 for mixing it with the ammonia. The resulting mixture or solution discharges through pipe 43 and is pumped by pump 44 into the main supply 45 to be treated. In some cases the pump is unnecessary. The mixture of water and ammonia will flow by gravity into the main supply. The supply of ammonia, as well as of chlorine to the liquid, may thus be continuous in the various embodiments.

The above descriptions only indicate a few of the ways in which the process can be carried out.

The use of ammonia compounds with chlorine and the use of chloramines in the sterilization of water is not new. Records of efforts along this line extend back for a good many years. That chloramines when used as a sterilization agent gave less taste in many waters and extended the length of time before new bacterial growths started has been known. None of this work, however, has ever given results of sufficient value to cause its continued or general employment in practice.

In contrast to this lack of results the process which I herein propose has given immediate practical results. By feeding the same amount of ammonia as of chlorine by weight, objectionable tastes have been completely eliminated from a large public water supply and the process has become its standard practice for some time. The amount of chlorine for sterilization has been greatly reduced and the aftergrowths in its storage reservoirs materially retarded. More recent work at other plants is giving the same results.

The amount of ammonia which must be used is not critical. Waters which give tastes when chlorinated vary widely in characteristics. The most economical dosage can be determined by experiment with each particular supply. A weight of ammonia equal to the weight of chlorine used has given generally satisfactory results. Effective results have been obtained with less.

The time of reaction between the ammonia and the water before the chlorine is added also is not critical. Practical application up to the present has allowed one to two hours. Experimental trials, however, have shown good results with very short reaction periods. It seems apparent, however, that up to reasonable limits the efficiency of the method increases with the length of time of reaction.

I claim:

1. In the sterilization of contaminated liquids, the process which comprises introducing ammonia gas (anhydrous ammonia) into the liquid, and after a predetermined elapsed time subjecting the liquid to the action of chlorine.

2. In the sterilization of contaminated liquids, the process which comprises mixing ammonia gas with a minor quantity of water as a carrier, introducing the said minor quantity of water with dissolved gas into the liquid to be treated, and after a predetermined elapsed time subjecting the liquid to be treated to the action of chlorine.

3. In the sterilization of flowing contaminated liquid, the process which comprises introducing ammonia gas into the flow at one point and introducing chlorine thereinto at a point further along in the flow, whereby a predetermined period of time elapses between the contacting of the ammonia with the liquid and the contacting of the sterilizing agent therewith.

4. In the sterilization of flowing contaminated liquid, the process which comprises establishing a separate minor flow of a mixture of water and ammonia gas and introducing the same continuously into the liquid at one point of its flow, and introducing chlorine continuously into the liquid at a point further along the flow, whereby a predetermined period of time elapses between the contacting of the ammonia with the liquid and the contacting of the chlorine therewith.

5. In the sterilization of contaminated liquid, the process which comprises introducing ammonia gas into the liquid under pressure, and after a predetermined elapsed time subjecting the liquid to chlorine under pressure.

EDW. D. RUTH.